United States Patent Office 3,058,981
Patented Oct. 16, 1962

3,058,981
2-METHYL-2-NONYL-4-HYDROXYMETHYL-1,3-DIOXOLANE AND CARBAMATES THEREOF
Souren Avakian, Oreland, and Gustav J. Martin, Philadelphia, Pa., assignors to Richardson-Merrell Inc., a corporation of Delaware
No Drawing. Filed Nov. 14, 1958, Ser. No. 773,824
7 Claims. (Cl. 260—247.2)

This invention relates to a new chemical compound, 2-methyl-2-nonyl-4-hydroxymethyl-1,3-dioxolane and carbamates thereof. These new compounds possess useful physiological properties which make them suitable for use as tranquilizing agents.

A number of 2,2-dialkyl-4-hydroxymethyl-1,3-dioxolanes in which the alkyl radicals have one to seven carbon atoms are known. These compounds have muscle relaxing, paralyzing and tranquilizing activities, the physiological activity depending somewhat upon the amount of the compound that is administered. The compound of the present invention, 2-methyl-2-nonyl-4-hydroxymethyl-1,3-dioxolane, possesses a tranquilizing activity which is somewhat higher than that of other known 2,2-dialkyl-4-hydroxymethyl-1,3-dioxolanes; moreover, the new compound of the present invention shows the unexpected property of possessing an unusually long period of activity, its tranquilizing activity lasting from 2⅓ times that of 2,2-diisopropyl-4-hydroxy-1,3-dioxolane, more than twice that of the known 2-methyl-2-hexyl homolog, and about four times that of the known 2-methyl-2-heptyl-4-hydroxymethyl-1,3-dioxolane. This property makes it very valuable for use as a tranquilizer since it reduces the frequency of administration of the drug.

The new compound of the present invention is conveniently prepared by refluxing glycerine and methyl nonyl ketone at a temperature above 60° C. in an inert solvent, preferably a hydrocarbon solvent, in the presence of an acidic catalyst such as, for example, sulfuric acid or p-toluenesulfonic acid, until the approximately theoretical amount of water which is to be formed has been collected.

The new compound, a liquid, may be administered orally, parenterally, usually in oleaginous medium, or topically in an ointment. The preferred route of administration is oral, preferably in an enteric coated capsule.

The dosage range for humans may vary between 100 to 1000 milligrams daily with a preferred daily dose of 400 milligrams. It must be recognized, however, that in some cases more or less of the medicament may be desirably used so that the exact dosage can only be determined by the physician responsible for the treatment.

The dosage range for animals may range from 5 milligrams daily for a small animal like a cat to 5000 milligrams daily for large animals like cattle.

The following example illustrates the preparation of the compound of the invention. It is to be understood, however, that this example is for illustration only and is not to be construed as limiting the scope of the invention.

EXAMPLE I

*2-Methyl-2-Nonyl-4-Hydroxymethyl-1,3-Dioxolane*

A mixture of one mol of methyl nonyl ketone, one mol of glycerol and two grams of p-toluenesulfonic acid in 300 cc. of toluene is refluxed with stirring until about 18 cc. of water is collected. The resulting mixture is cooled, washed with water and dried over anhydrous sodium carbonate. After filtration to remove the drying agent, the filtrate is distilled under reduced pressure. The product distilled at 130–132° C. at 0.2 mm.

The carbamates of the invention may be prepared from 2-methyl-2-nonyl-4-hydroxymethyl-1,3-dioxolane by condensing with an excess of an alkyl carbamate (such as ethyl carbamate, propyl carbamate, other lower alkyl carbamates, etc.) in the presence of catalytic amounts of a basic catalyst such as aluminum isopropoxide, sodium methylate, etc. The reactants are heated (preferably at a temperature of about 150 to about 185° C.) until liberation of the alcohol (e.g. ethyl alcohol) is complete. The reaction mixture is filtered to separate the catalyst, then poured into water and cooled until the carbamate solidifies. The carbamate is then separated by filtration and may be purified by recrystallization from materials such as petroleum ether, etc. The carbamates of the invention may also be prepared by treating the desired dioxolane with phosgene in an anhydrous medium to form the carbonyl chloride, then reacting that product with ammonia or an amine in an anhydrous or aqueous medium to obtain the carbamate.

These new carbamates are substantially tasteless and odorless solids and possess the same essential physiological properties as the alcohol, 2-methyl-2-nonyl-4-hydroxymethyl-1,3-dioxolane, and have the advantage, however, that they can be compressed into tablets or made into other pharmaceutically acceptable forms which require the use of solids. Because of their tasteless and odorless characteristics, they can be prepared and administered without having an enteric coating. They may, of course, be prepared in the usual pharmaceutical forms such as tablets, capsules, liquid suspensions, elixirs and the like.

This application is a continuation-in-part of our application Serial No. 641,441, filed February 21, 1957, now abandoned.

EXAMPLE II

*2-Methyl-2-Nonyl-4-Hydroxymethyl-1,3-Dioxolane Carbamate*

To a solution of 109 gm. phosgene in anhydrous benzene is added dropwise and with vigorous stirring 368 gm. 2 - methyl - 2 - n - nonyl - 4 - hydroxymethyl - 1,3-dioxolane in anhydrous ethyl ether solution. The mixture is maintained at a temperature of 0° to 5° C. throughout. After stirring and cooling for an additional thirty minutes, 133 gm. dimethylaniline is added. This mixture is stirred and cooled for an additional forty-five minutes, after which it is filtered. The filter cake is washed with anhydrous ether, and the washings combined with the original solution. The carbonyl chloride may be used directly without further isolation.

A benzene ethyl ether solution containing 0.10 mol of the carbonyl chloride prepared as described in the above paragraph is added with vigorous stirring to 50 ml. aqueous ammonia, cooled to 0° to 5° C. Stirring and cooling are continued for about two hours. At the end of this period the organic and aqueous phases are separated, the organic layer washed with water, dried over anhydrous sodium sulfate and concentrated under reduced pressure. The residue, after having been mixed with petroleum ether and filtered, gives a crystalline mixture of two racemates which melts at 61° to 66°. By recrystallizing the racemates from benzene, the two are separated. The high-melting racemate is obtained directly and melts at 79° to 80° C. The benzene solution is concentrated and the residue recrystallized from petroleum ether giving the low-melting racemate which melts at 63° to 64° C.

EXAMPLE III

*2-Methyl-2-Nonyl-4(N-Morpholylcarbonyloxymethyl)-1,3-Dioxolane*

A benzene-ethyl ether solution containing 0.10 mol of the carbonyl chloride of 2-methyl-2-nonyl-4-hydroxymethyl-1,3-dioxolane prepared as described in Example II is added with stirring to 0.21 mol morpholine in anhydrous ethyl ether. The mixture is allowed to stand for about two hours at 0° to 5° C., washed several times with water, dried over anhydrous sodium sulfate and concentrated in vacuo. The residue is distilled at 159° to 160° C./0.03 mm.

EXAMPLE IV

2-Methyl-2-Nonyl-4(N-Piperidinecarbonyloxymethyl)1,3-Dioxolane

A benzene-ethyl ether solution containing 0.10 mol of the carbonyl chloride of 2-methyl-2-nonyl-4-hydroxymethyl-1,3-dioxolane is added with stirring to 0.21 mol piperidine in anhydrous ethyl ether. The mixture is allowed to stand for about two hours at 0° to 5° C., washed several items with water, dried over anhydrous sodium sulfate and concentrated in vacuo. The residue is distilled at 165° C./0.10 mm.

EXAMPLE V

N-Allylcarbamate of 2-Methyl-2-Nonyl-4-Hydroxymethyl-1,3-Dioxolane

A benzene-ethyl ether solution containing 0.10 mol of the carbonyl chloride of 2-methyl-2-nonyl-4-hydroxymethyl-1,3-dioxolate is added with stirring to 0.21 mol allylamine in anhydrous ethyl ether. The mixture is allowed to stand for about two hours at 0° to 5° C., washed several times with water, dried over anhydrous sodium sulfate and concentrated in vacuo. The residue is distilled at 158° C./0.2 mm.

EXAMPLE VI

2-Methyl-2-Nonyl-4(2,2-Dimethylhydrazinocarbonyloxymethyl)-1,3-Dioxolane Hydrochloride A benzene-ethyl ether solution containing 0.10 mol of the carbonyl chloride of 2-methyl-2-nonyl-4-hydroxymethyl-1,3-dioxolane is added with stirring to 0.21 mol unsymmetrical-dimethyl hydrazine in anhydrous ethyl ether. The mixture is allowed to stand for about two hours at 0° to 5° C., washed several times with water, dried over anhydrous sodium sulfate and concentrated to dryness in vacuo. The residue is taken up in petroleum ether. Gaseous hydrogen chloride is passed through the solution. The crystalline hydrochloride is filtered off, and the filter cake washed with ethyl ether. The hydrochloride melts at 123° to 125° C.

EXAMPLE VII

N - (Dimethylaminopropyl) - Carbamate of 2 - Methyl- 2 - Nonyl - 4 - Hydroxymethyl - 1,3 - Dioxolane Hydrochloride A benzene-ethyl ether solution containing 0.10 mol of the carbonyl chloride of 2-methyl-2-nonyl-4-hydroxymethyl-1,3-dioxolane is added with stirring to 0.21 mol dimethylaminopropylamino in anhydrous ethyl ether. The mixture is allowed to stand for about two hours at 0° to 5° C., washed several times with water and dried over anhydrous sodium sulfate. Dry hydrogen chloride gas, when bubbled through the benzene/ether solution of the carbamate, yields the hydrochloride.

We claim:
1. 2 - methyl - 2 - nonyl - 4 - hydroxymethyl - 1,3 - dioxolane.
2. N-(3-dimethylaminopropyl)carbamate of 2-methyl-2-nonyl-4-hydroxymethyl-1,3-dioxolane.
3. 2 - methyl - 2 - nonyl - 4(N - morpholinocarbonyloxymethyl)-1,3-dioxolane.
4. 2 - methyl - 2- nonyl - 4 - (2,2 - dimethylhydrazinocarbonyloxymethyl)-1,3-dioxolane.
5. 2 - methyl - 2 - nonyl - 4 - hydroxymethyl - 1,3 - dioxolane carbamate.
6. 2 - methyl - 2 - nonyl - 4(N - piperidinecarbonyloxymethyl)-1,3-dioxolane.
7. N - allylcarbamate of 2 - methyl - 2 - nonyl - 4 - hydroxymethyl-1,3-dioxolane.

References Cited in the file of this patent
UNITED STATES PATENTS

| | | |
|---|---|---|
| 2,648,680 | Brandner | Aug. 11, 1953 |

FOREIGN PATENTS

| | | |
|---|---|---|
| 559,678 | Great Britain | Mar. 1, 1944 |
| 503,497 | Germany | Aug. 7, 1930 |

OTHER REFERENCES

Berger et al.: Science, vol. 108, July-December 1948, pp. 561–2.